United States Patent
Hsieh et al.

(10) Patent No.: US 9,442,592 B2
(45) Date of Patent: Sep. 13, 2016

(54) MODULE STRUCTURE OF TOUCH DISPLAY PANEL

(71) Applicant: GIANTPLUS TECHNOLOGY CO., LTD., Miao-Li County (TW)

(72) Inventors: Yu-Chung Hsieh, Miao-Li County (TW); Huei-Ling Liao, Miao-Li County (TW); Kai-Dun Chang, Miao-Li County (TW); Jung-Fu Hsu, Miao-Li County (TW)

(73) Assignee: Giantplus Technology Co., Ltd., Miao-Li County (TW)

( * ) Notice: Subject to any disclaimer, the term of this patent is extended or adjusted under 35 U.S.C. 154(b) by 0 days.

(21) Appl. No.: 14/513,418

(22) Filed: Oct. 14, 2014

(65) Prior Publication Data

US 2015/0363029 A1 Dec. 17, 2015

(30) Foreign Application Priority Data

Jun. 13, 2014 (TW) .............................. 103120473 A

(51) Int. Cl.
*G02F 1/1335* (2006.01)
*G06F 3/041* (2006.01)
*G02F 1/1333* (2006.01)

(52) U.S. Cl.
CPC ....... *G06F 3/0412* (2013.01); *G02F 1/133308* (2013.01); *G02F 1/13338* (2013.01)

(58) Field of Classification Search
CPC .......................... G06F 3/0412; G02F 1/13338
See application file for complete search history.

(56) References Cited

U.S. PATENT DOCUMENTS

| | | | |
|---|---|---|---|
| 2010/0328240 A1* | 12/2010 | Matsubara | G06F 3/044 345/173 |
| 2012/0052929 A1* | 3/2012 | Thammasouk | G06F 1/626 455/575.1 |
| 2013/0044074 A1* | 2/2013 | Park | G02F 1/13338 345/174 |
| 2015/0029413 A1* | 1/2015 | Chang | G06F 3/0412 349/12 |
| 2015/0070298 A1* | 3/2015 | Shih | G02F 1/13338 345/174 |

FOREIGN PATENT DOCUMENTS

| | | |
|---|---|---|
| TW | M400035 U | 3/2011 |
| TW | 201229619 A | 7/2012 |
| TW | M472897 U | 2/2014 |

* cited by examiner

*Primary Examiner* — Donald Raleigh

(74) *Attorney, Agent, or Firm* — Rosenberg, Klein & Lee

(57) ABSTRACT

A module structure of touch display panel is provided. The module structure comprises a backlight module, a liquid crystal panel, a touch layer, a first circuit board, a second circuit board, and a protection layer. The liquid crystal panel is disposed above the backlight module; the touch layer is disposed on the liquid crystal panel. The first circuit board is disposed on the liquid crystal panel, and is further disposed with a first side of the liquid crystal panel and a first side of the touch layer. The second circuit board is disposed on the liquid crystal panel, and is further disposed with a second side of the liquid crystal panel and a second side of the touch layer. Additionally, the protection layer is disposed above the touch layer, the first circuit board, and the second circuit board.

7 Claims, 14 Drawing Sheets

MODULE STRUCTURE OF TOUCH DISPLAY PANEL

FIELD OF THE INVENTION

The present invention relates generally to a module structure of touch display panel, and in particularly, a module structure of touch display panel with on-cell/in-cell touch functions.

BACKGROUND OF THE INVENTION

Currently, the methods for combining a touch panel and a display panel include the on-cell/in-cell method and the add-on method of attaching a touch panel to a display panel directly. Nonetheless, there's a drawback of excessive thickness and bulkiness of combining a touch panel and a display panel by add-on method. Thereby, the on-cell/in-cell method is adopted generally for combining a touch panel and a display panel.

In addition, in a general on-cell/in-cell touch display panel, the touch patterns in the display region fabricate on the color filter (CF) substrate only. The physical keys and the touch panel of a touch display panel are not integrated in the same substrate. Consequently, the functional specifications of an innovative product cannot be met.

Accordingly, the present invention provides a module structure of touch display panel for satisfying the requirements of an innovative product.

SUMMARY

An objective of the present invention is to provide a module structure of touch display panel, which integrates an on-cell/in-cell touch panel and the touch functions of physical keys in the same substrate for satisfying the requirements of an innovative product.

In order to achieve the above objective, the touch display panel comprises a backlight module, a liquid crystal panel, a touch layer, a first circuit board, a second circuit board, and a protection layer. The liquid crystal panel is disposed above the backlight module; the touch layer is disposed on the liquid crystal panel. The first circuit board is disposed on the liquid crystal panel, and is further disposed with a first side of the liquid crystal panel and a first side of the touch layer. The second circuit board is disposed on the liquid crystal panel, and is further disposed with a second side of the liquid crystal panel and a second side of the touch layer. Additionally, the protection layer is disposed above the touch layer, the first circuit board, and the second circuit board.

Alternatively, the touch display panel comprises a backlight module, a liquid crystal panel, a touch layer, at least a user interface unit, a first circuit board, and a protection layer. The liquid crystal panel is disposed above the backlight module; the touch layer is disposed on the liquid crystal panel. The user interface unit is located on a first inner side of the edge of the touch layer. The first circuit board is disposed on the liquid crystal panel, and is further disposed with a first side of the liquid crystal panel and a first side of the touch layer. The protection layer is disposed above the touch layer and the first circuit board.

DETAILED DESCRIPTION

Figure 1:
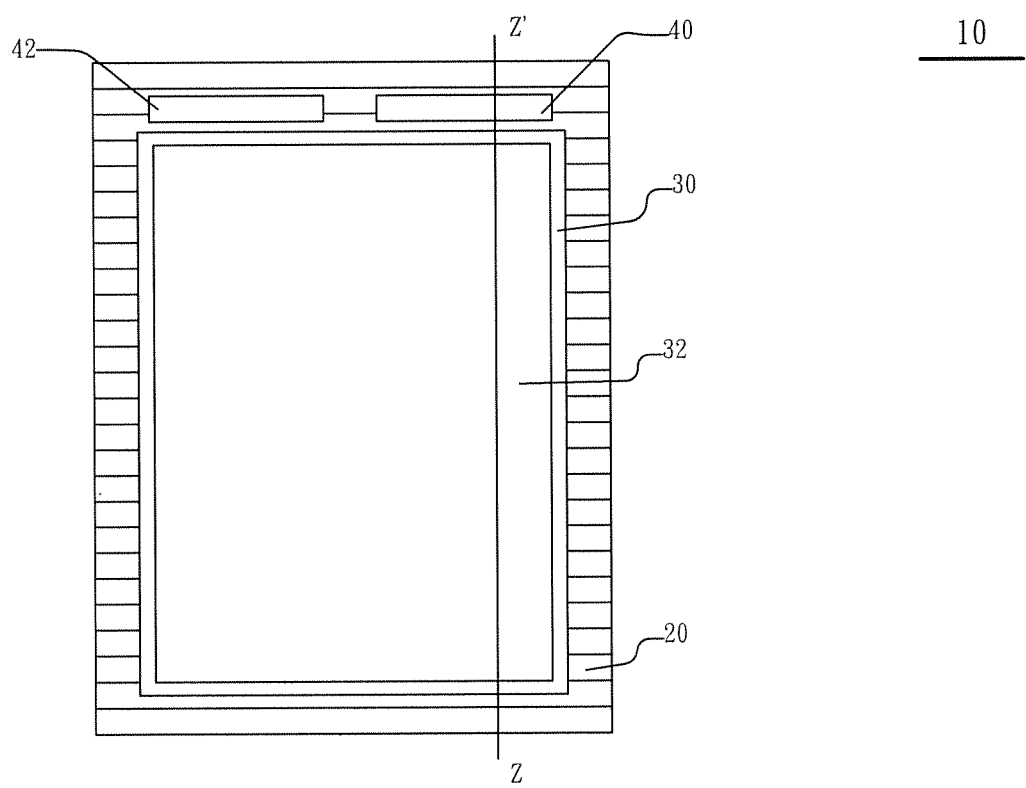
FIG. 1 shows a top view of the touch display panel according the first embodiment of the present invention.
Figure 2:
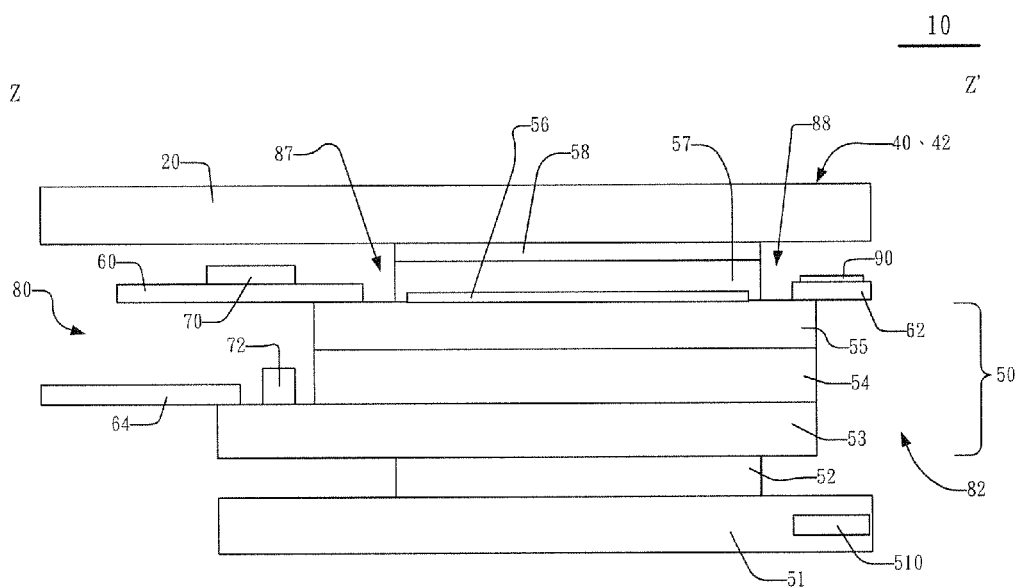
FIG. 2 shows a first cross-sectional view along the ZZ' line in FIG. 1.

Please refer to FIG. 1 and FIG. 2. FIG. 1 shows a top view of the touch display panel 10 according the first embodiment of the present invention; FIG. 2 shows a first cross-sectional view along the ZZ' line in FIG. 1. As shown in the figures, the touch display panel 10 according to the present invention comprises a backlight module 51, a liquid crystal panel 50, a touch layer 56, a first circuit board 60, a second circuit board 62, and a protection layer 20. The liquid crystal panel 50 is disposed above the backlight module 51; the touch layer 56 is disposed on the liquid crystal panel 50. The first circuit board 60 is disposed on the liquid crystal panel 50, and is further disposed with a first side 80 of the liquid crystal panel 50 and a first side 87 of the touch layer 56. The second circuit board 62 is disposed on the liquid crystal panel 50, and is further disposed with a second side 82 of the liquid crystal panel 50 and a second side 88 of the touch layer 56. Additionally, the protection layer 20 is disposed above the first circuit board 60, the liquid crystal panel 50, and the second circuit board 62. According to the touch display panel 10 of the present invention, the touch operations of the touch panel are designed on the touch layer 56, and the touch operations of physical keys are designed on the second circuit board 62. Consequently, the touch display panel 10 according to the present invention integrates the touch functions of the on-cell/in-cell touch panel and physical keys in the liquid crystal panel 50, and thus achieving the application requirements for innovative products.

Please refer again to FIGS. 1 and 2. The backlight module 51 is used for providing the light source required by the module structure of touch display panel 10. The liquid crystal panel 50 is used for displaying frames. The touch layer 56 is the place for forming transparent electrodes, for example, driving electrodes and detection electrodes. The driving electrodes receive a signal; the detection electrodes detects the variation of the signal for acquiring the touch information given by a user by operating in the touch region 30. The first and second circuit boards 60, 62 can be flexible printed circuit (FPC) boards. In addition, the second circuit board 62 can be a user interface circuit board including the user interface unit 90. The light source of the user interface unit 90 can be provided by a diode light source 510 is a light-emitting diode (LED). Moreover, the second circuit board 62 can be a light-pervious material. Hence, there will be no shelter between the diode light source 510 and the user interface unit 90. By using the user interface unit 90 on the second circuit board 62, the touch display panel 10 according to the present invention can acquire the touch information of a user. Besides, according to the present invention, the number of the user interface units 90 is not limited; it can be altered depending on the requirement. The protection layer 20 is used for avoiding damages and external interferences inside the panel. The material of the protection layer 20 can be glass, plastics, or decoration films. The thickness of the protection layer 20 made of glass and plastic is 0.5~0.7 mm; the thickness of the protection layer 20 made of decoration films is 0.2 mm.

In addition, a bottom polarization film 52 of the touch display panel 10 according to the present invention is disposed between the backlight module 51 and the liquid crystal panel 50; a top polarization file 57 is disposed between the protection layer 20 and the liquid crystal panel 50. Besides, the touch display panel 10 according to the present invention further comprises a touch chip 70 and an adhesion layer 58. The touch chip 70 is disposed on the surface of the first circuit board 60; the adhesion layer 58 is disposed between the top polarization film 57 and the protection layer 20. The liquid crystal panel 50 comprises a bottom substrate 53, a liquid crystal layer 54, a third circuit board 64, a display chip 72, and a top substrate 55. The bottom substrate 53 is disposed on the bottom polarization film 52; the liquid crystal layer 54 is disposed on the bottom substrate 53; the third circuit board 64 is disposed on the surface of the bottom substrate 53. The display chip 72 is disposed on the surface of the bottom substrate 53 and between the third circuit board 64 and the liquid crystal layer 54, and connected electrically to the third circuit board 64. The top substrate 55 is disposed on the liquid crystal layer 54. The top substrate 55 can be a color filter substrate. Moreover, the first and second circuit boards 60, 62 are disposed on the surface of the top substrate 55.

As shown in FIG. 1, the present invention further comprises at least a user interface pattern 40, 42. The user interface patterns 40, 42 are disposed on the surface of the protection layer 20. The light source required by the user interface patterns 40, 42 can be provided by the diode light source 510. In addition to the light-pervious material as described above, the second circuit board 62 can include an opening, so that the light source provided by the diode light source 510 can penetrate the second circuit board 62 and reach the user interface pattern 40, 42. The diode light source 510 is designed inside the backlight module 51 corresponding to the disposition locations of the user interface patterns 40, 42, as shown in FIG. 2. Besides, the disposition locations of the user interface patterns 40, 42 also correspond to the disposition location of the second circuit board 62. Thereby, when the second circuit board 62 is disposed on the second side 82 of the liquid crystal panel 50 as shown in FIG. 2, the user interface patterns 40, 42 are disposed on the top side of the touch region 30 as shown in FIG. 1 and corresponding to the disposition location of the second circuit board 62. Besides, the user interface patterns 40, 42 are located outside the touch region 30 and the display region 32, as shown in FIG. 1. Furthermore, according to the embodiment of FIG. 2, the diode light source 510 is not required. Please refer to FIG. 3, which shows a second cross-sectional view along the ZZ' line in FIG. 1. As shown in the figure, the light source required by the user interface unit 90 and the user interface patterns 40, 42 is provided by the backlight module 51 instead.

Figure 4:
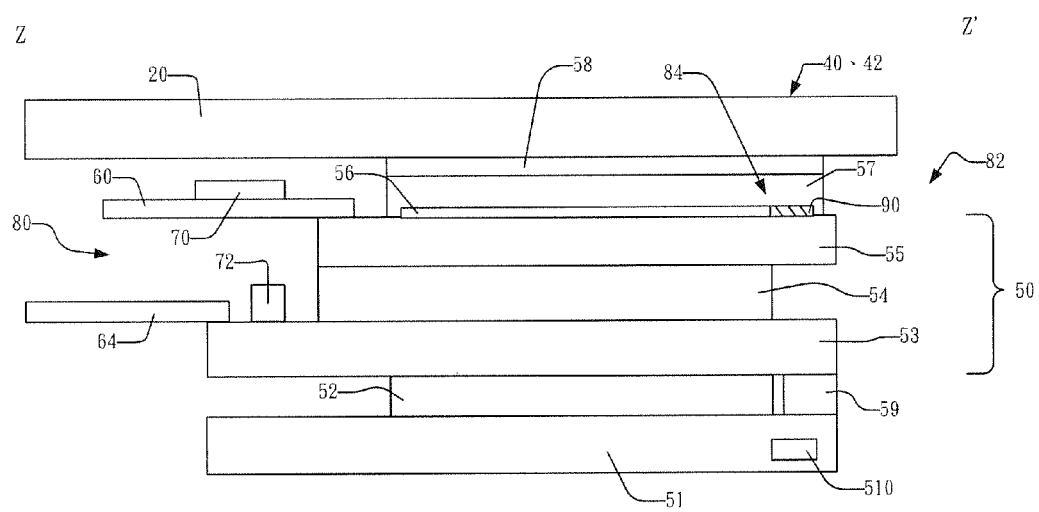
FIG. 4 shows a third cross-sectional view along the ZZ' line in FIG. 1.

Nonetheless, according to the module structure of touch display panel 10 of the present invention, the user interface unit 90 is not necessarily disposed on the second circuit board 62. Please refer to FIG. 4, which shows a third cross-sectional view along the ZZ' line in FIG. 1. As shown in the figure, the difference between FIG. 4 and FIG. 2 is that the second circuit board 62 is not disposed in FIG. 4. Instead, the user interface unit 90 is designed on a first inner side 84 on the edge of the touch layer 56. In addition, as shown in FIG. 4, it is not necessary that the user interface unit 90 overlaps the liquid crystal layer 54 of the display region 32 (shown in FIG. 1). Besides, because the disposition locations of the user interface patterns 40, 42 correspond to the disposition location of the user interface unit 90, according to FIG. 1, it is observed that the disposition location of the user interface unit 90 is still outside the touch region 30 and the display region 32. In particular, the range of the display region 32 is smaller than that of the touch region 30.

Figure 3:
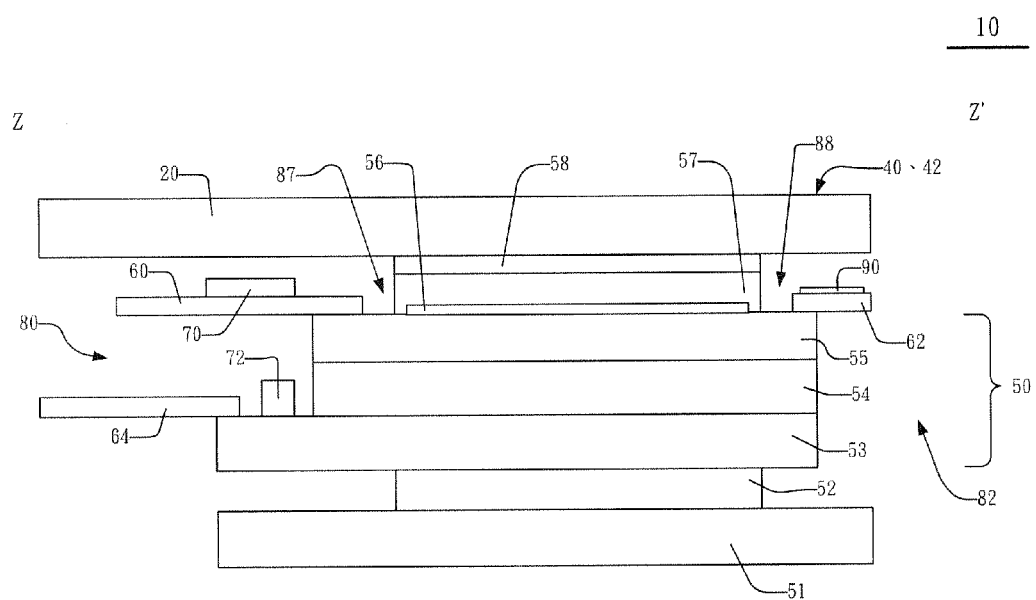
FIG. 3 shows a second cross-sectional view along the ZZ' line in FIG. 1.
Figure 5:
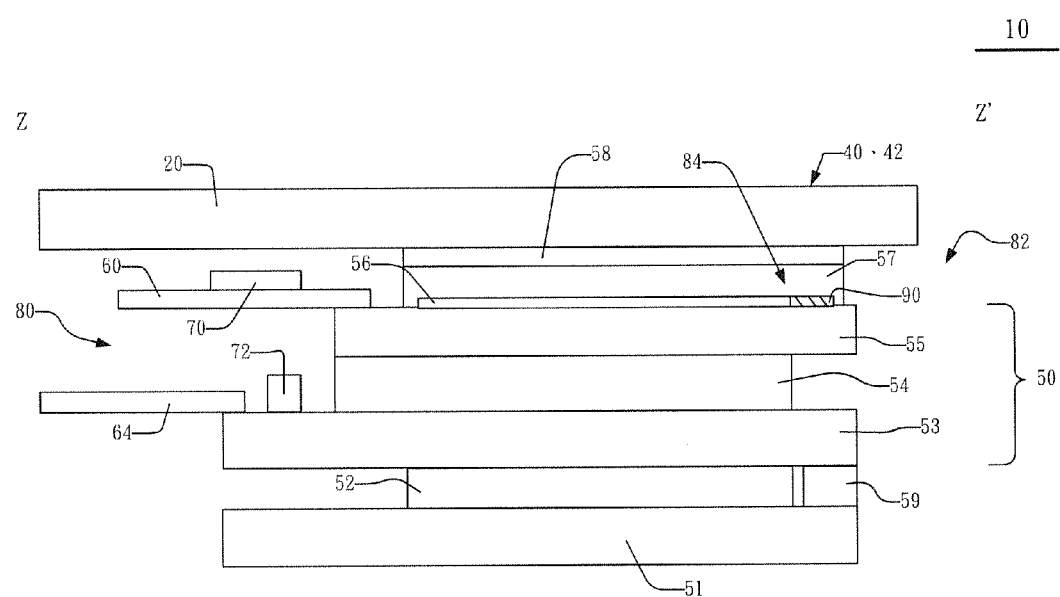
FIG. 5 shows a fourth cross-sectional view along the ZZ' line in FIG. 1.

When the user interface unit 90 is designed in the touch layer 56, as shown in the FIG. 4, and located outside the display region 32, as shown in FIG. 1, the light source required by the user interface unit 90 can still be provided by the diode light source 510. In addition, FIG. 4 further comprises a support member 59 between the backlight module 51 and the liquid crystal panel 50 for supporting the liquid crystal panel 50. Besides, the design of the embodiment in FIG. 4 can be changed to FIG. 5, which shows a fourth cross-sectional view along the ZZ' line in FIG. 1. As shown in the figure, the difference between FIG. 5 and FIG. 3 is that there is no diode light source 510 in FIG. 5. Thereby, the light source required by the user interface patterns 40, 42 is provided by the backlight module 51 instead. Thereby, according to the design of FIG. 4, the disposition and cost of the second circuit board 62 can be saved. According to the design of FIG. 5, the disposition and cost of the second circuit board 62 and the diode light source 510 can be saved. Nonetheless, the location of the user interface unit 90 of the touch display panel 10 according to the present invention is not limited to the first inner side 84 of the edge of the touch layer 56, as shown in FIGS. 4 and 5; the location of the second circuit board 62 is not limited to the second side 82 of the liquid crystal panel 50, as shown in FIGS. 2 and 3. Other design method can be adopted as well, as described in the following.

Figure 6:
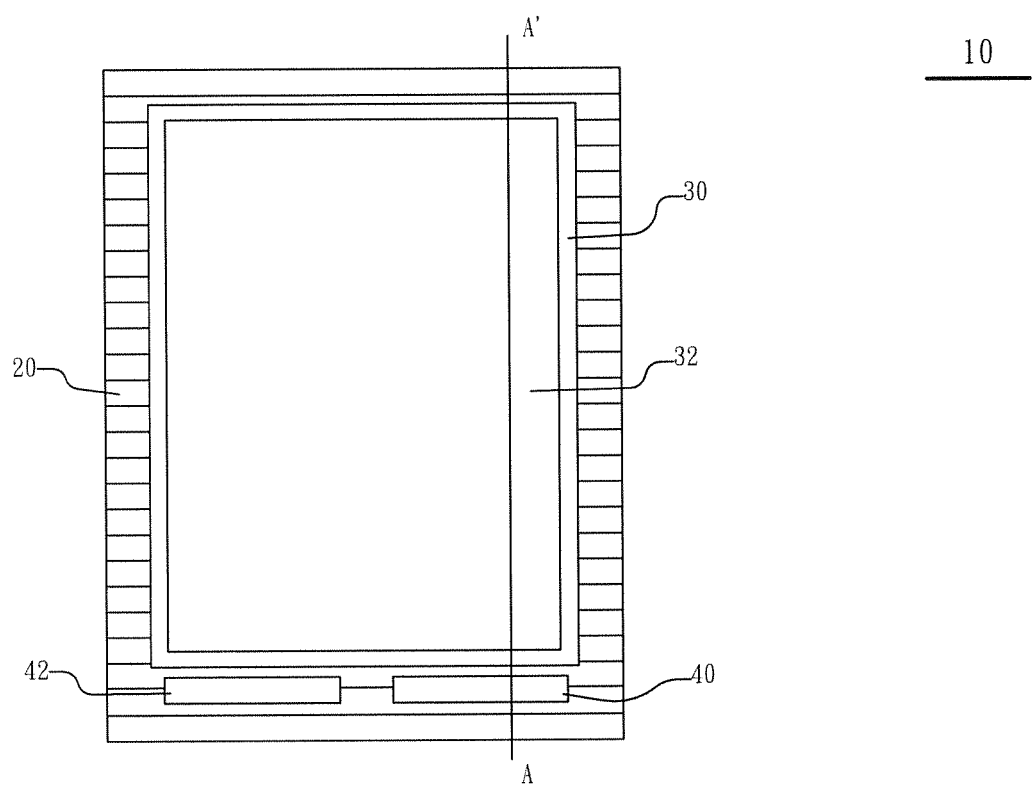
FIG. 6 shows a top view of the touch display panel according the second embodiment of the present invention.
Figure 7:
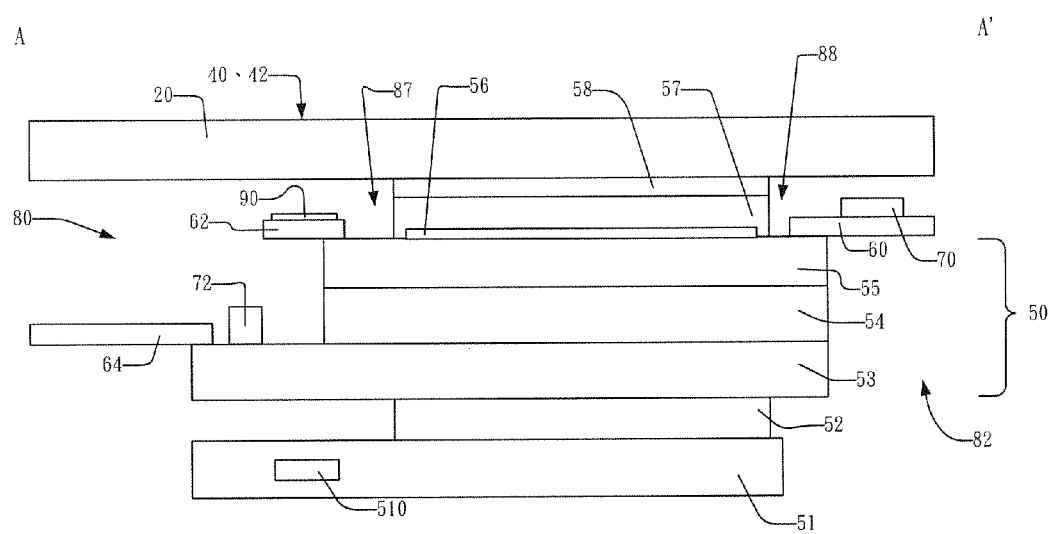
FIG. 7 shows a first cross-sectional view along the AA' line in FIG. 6.
Figure 8:
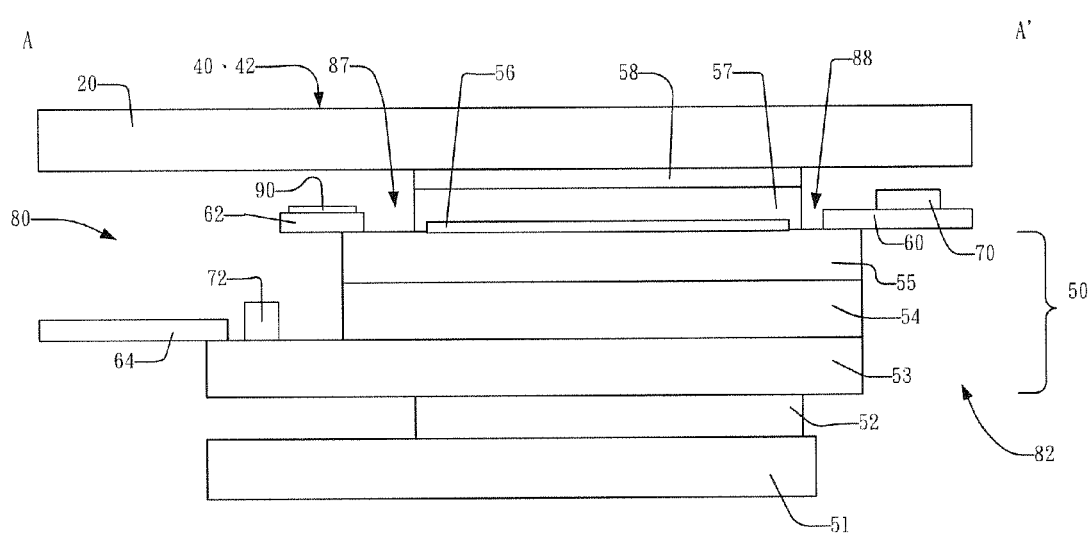
FIG. 8 shows a second cross-sectional view along the AA' line in FIG. 6.

Please refer to FIG. 6, which shows a top view of the touch display panel 10 according the second embodiment of the present invention. As shown in the figure, the user interface patterns 40, 42 according to the present invention can be alternatively designed on the bottom side of the touch region 30. Nonetheless, the user interface patterns 40, 42 are still outside the touch region 30 and the display region 32. The change in the structure is shown in FIG. 7, which shows a first cross-sectional view along the AA' line in FIG. 6. As shown in the figure, the difference between FIG. 7 and FIG. 2 is that in FIG. 7, the first circuit board 60 changed to the second side 82 and the second circuit board 62 is changed to the first side 80. Thereby, the disposition locations of the user interface patterns 40, 42 correspond to the second circuit board 62 disposed on the first side 80 of the liquid crystal panel 50. Likewise, the structure in FIG. 7 requires no diode light source 510. The change in the structure is shown in FIG. 8, which shows a second cross-sectional view along the AA' line in FIG. 6. As shown in the figure, the difference between FIG. 8 and FIG. 7 is that in FIG. 8, the diode light source 510 is not disposed. Instead, the backlight module 51 provides the light source required by the user interface patterns 40, 42. Similarly, the structures in FIGS. 7 and 8 require no second circuit board 62. The embodiment is shown in FIG. 9.

Figure 9:
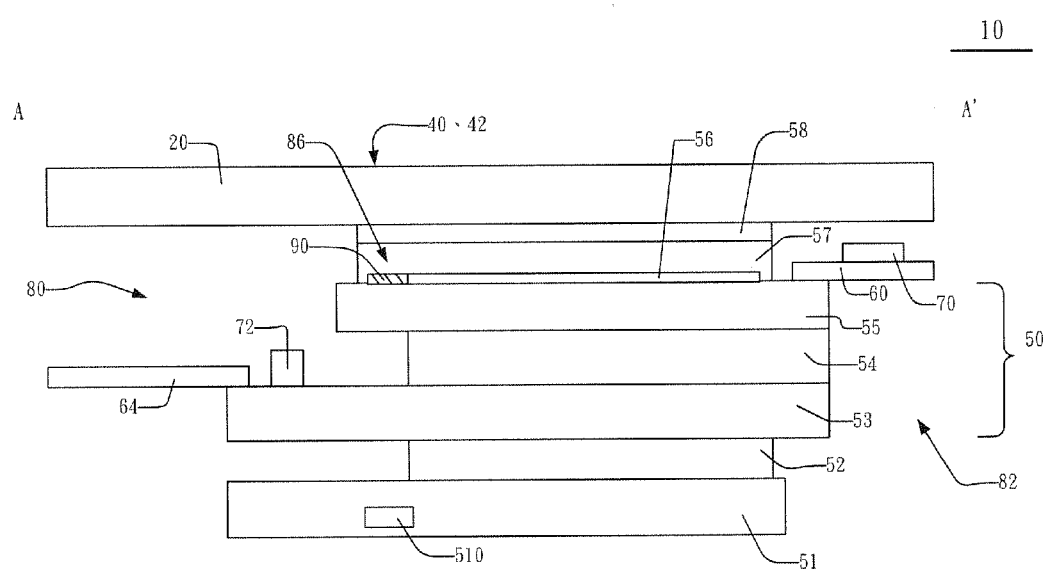
FIG. 9 shows a third cross-sectional view along the AA' line in FIG. 6.
Figure 10:
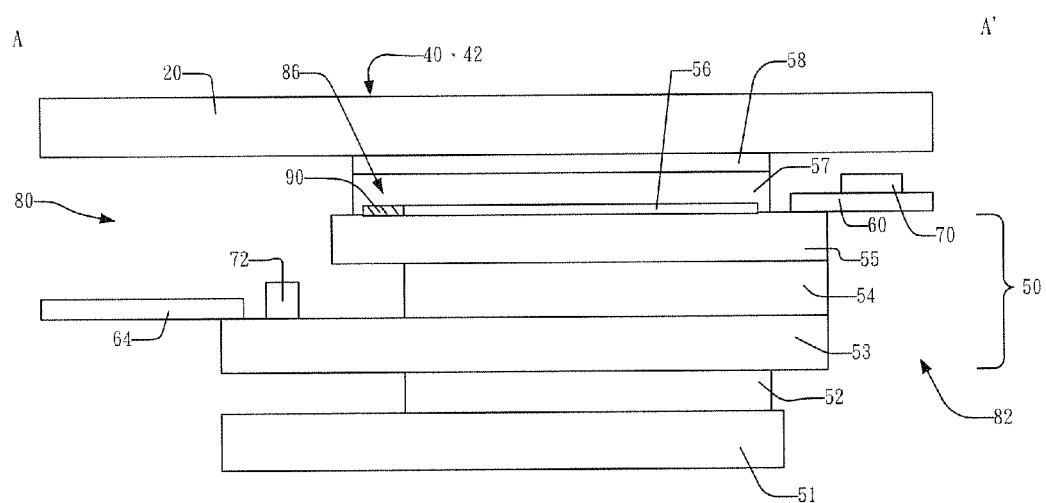
FIG. 10 shows a fourth cross-sectional view along the AA' line in FIG. 6.

FIG. 9 shows a third cross-sectional view along the AA' line in FIG. 6. As shown in the figure, the difference between FIG. 9 and FIG. 7 is that in FIG. 9, the user interface unit 90 is changed to a second inner side 86 on the edge of the touch layer 56 and the first circuit board 60 is moved to the second side 82 of the liquid crystal panel 50. Thereby, according to the embodiment of FIG. 9, the light source required by the user interface patterns 40, 42 is still provided by the diode light source 510. Likewise, in FIG. 5, it is observed that the user interface unit 90 is still located outside the touch region 30 and the display region 32. In other words, the user interface unit 90 can still not overlap the liquid crystal layer 54 (shown in FIG. 9) of the display region (shown in FIG. 6). In addition, according to the embodiment of FIG. 9, the disposition and cost of the second circuit board 62 is not required; the user interface patterns 40, 42 are disposed outside the touch region 30 and the display region 32, as shown in FIG. 6; and the user interface unit 90 is disposed on the second inner side 86 of the touch layer 56, as shown in FIG. 9. Moreover, please refer to FIG. 10, which shows a fourth cross-sectional view along the AA' line in FIG. 6. As shown in the figure, the difference between FIG. 10 and FIG. 9 is that in FIG. 10, no diode light source 510 is disposed. Thereby, the light source required by the user interface patterns 40, 42 according to the present invention can be provided by the backlight module 51.

The user interface patterns 40, 42 according to the present invention can be designed on the top side (as shown in FIG. 1) and bottom side (as shown in FIG. 6) of the touch region 30. The second circuit board 62 can be designed on the first side 80 (as shown in FIGS. 7 and 8) and the second side 82 (as shown in FIGS. 2 and 3) of the liquid crystal panel 50. Besides, the user interface unit 90 can be designed on the second circuit board 62 (as shown in FIGS. 2, 3, 7, 8), the first inner side 84 (as shown in FIGS. 4 and 5), or the second inner side 86 (as shown in FIGS. 9 and 10) of the touch layer 56. Nonetheless, according to the touch display panel 10 of the present invention, in addition to designing the user interface unit 90 in the display region 32, the user interface unit 90 can be further designed in the display region 32 as follows.

Figure 11:
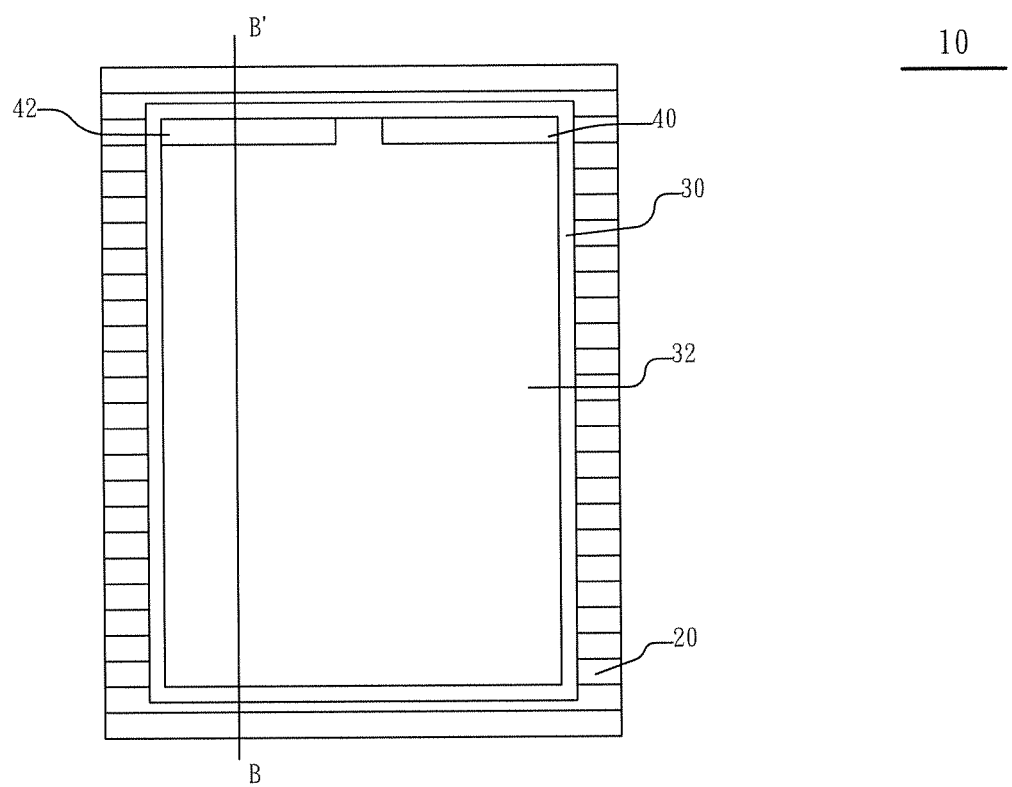
FIG. 11 shows a top view of the touch display panel according the third embodiment of the present invention.
Figure 12:
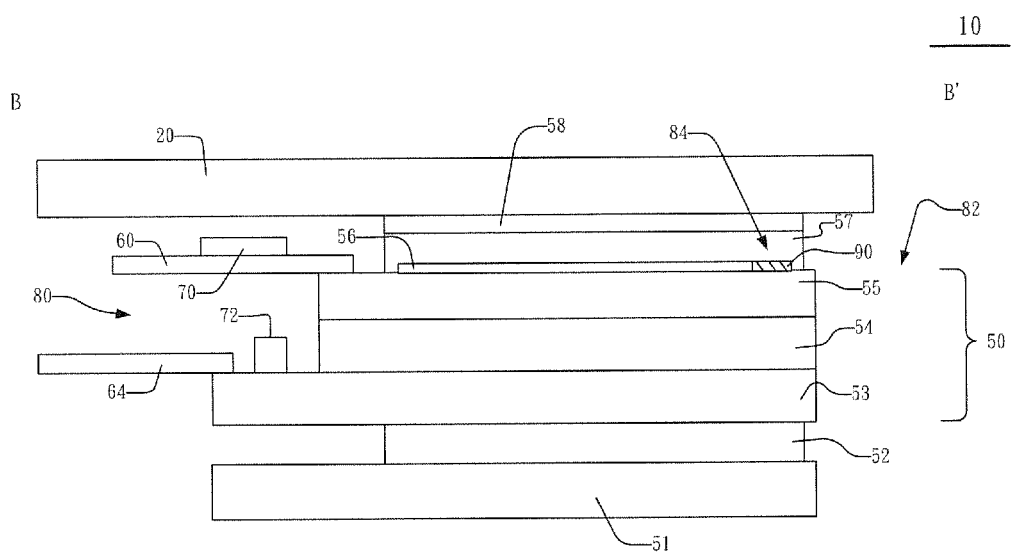
FIG. 12 shows a cross-sectional view along the BB' line in FIG. 11.

Please refer to FIG. 11, which shows a top view of the touch display panel according the third embodiment of the present invention. As shown in the figure, the difference between FIG. 11 and FIG. 1 is that in FIG. 11, the user interface patterns 40, 42 according to the present invention are designed on the inner sides of the touch region 30 and the display region 32. Because the user interface patterns 40, 42 according to the present embodiment are designed in the display region 32, the user interface patterns 40, 42 are displayed by the liquid crystal panel 50, instead of designed on the surface of the protection layer 20. The change in the structure is shown in FIG. 12, which shows a cross-sectional view along the BB' line in FIG. 11. As shown in the figure, the difference between FIG. 12 and FIGS. 4 and 5 is that, according to the embodiment in FIG. 12, the user interface unit 90 is designed on the first inner side 84 of the touch layer 56. In addition, the user interface unit 90 is located between a top polarization film 57 and a bottom polarization film 52 and may overlap the display region 32. In other words, the touch display panel 10 according to the present embodiment requires no diode light source 510. The light source required by the user interface patterns 40, 42 is provided by the backlight module 51 instead. Thereby, the light emitted by the backlight module 51 passes through the liquid crystal panel 50 and reaches the user interface patterns 40, 42, and then acts as the light source for the user interface patterns 40, 42. Accordingly, the present design can reduced the cost of disposing a light source. Nonetheless, the embodiment in FIG. 12 can be modified, as described in the following.

Figure 13:
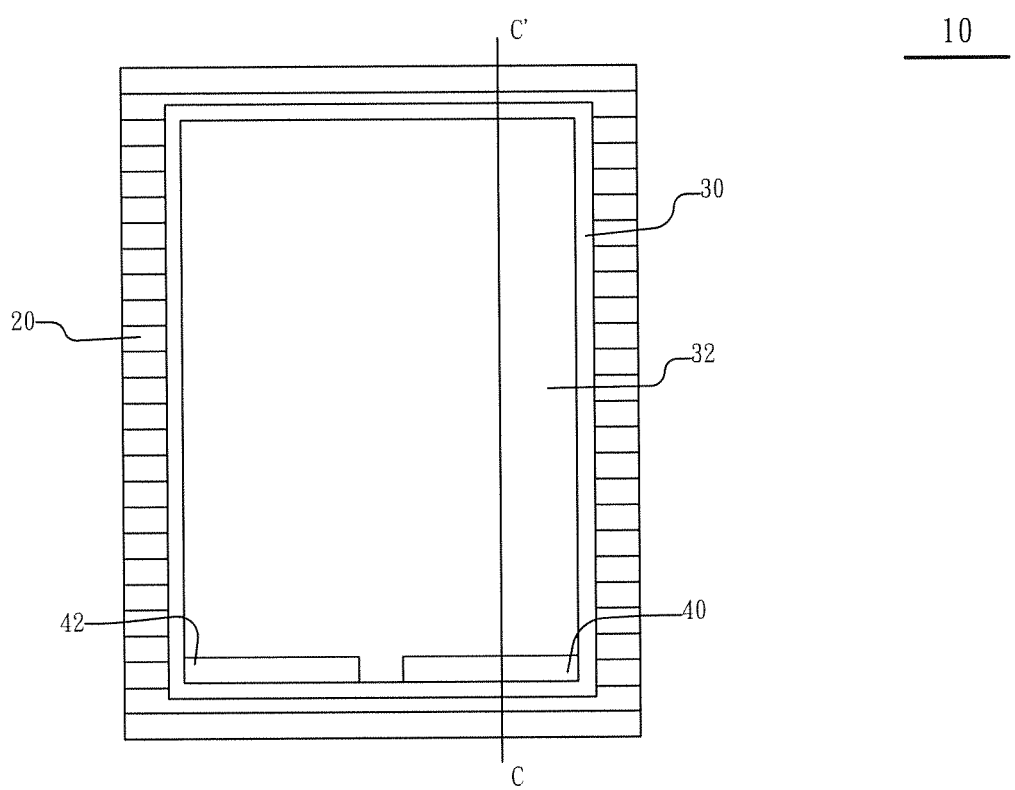
FIG. 13 shows a top view of the touch display panel according the fourth embodiment of the present invention.
Figure 14:
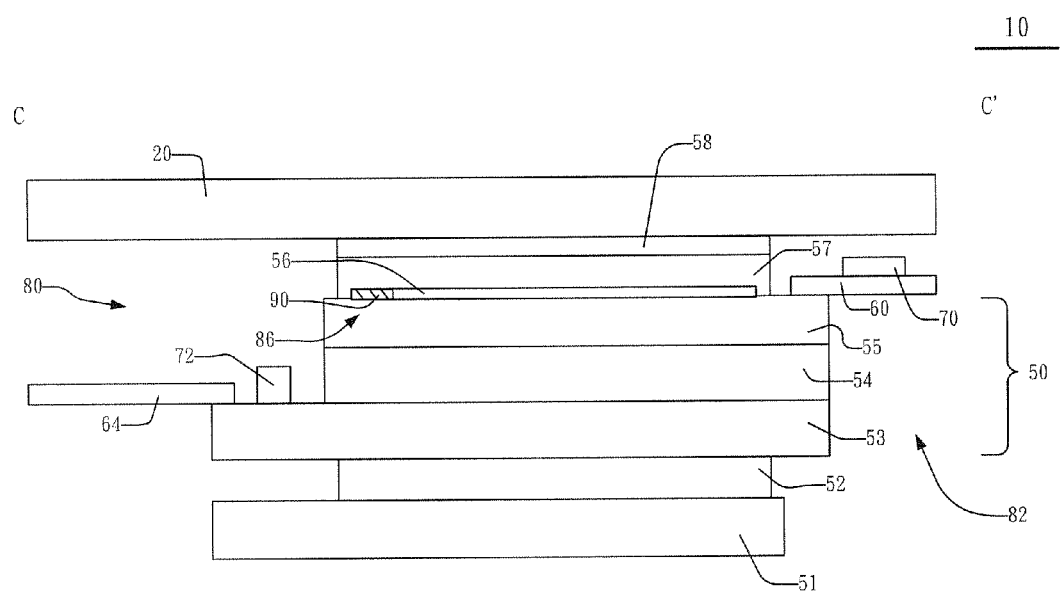
FIG. 14 shows a cross-sectional view along the CC' line in FIG. 13.

Please refer to FIG. 13, which shows a top view of the touch display panel according the fourth embodiment of the present invention. As shown in FIG. 13, the difference between FIG. 13 and FIG. 11 is that the user interface patterns 40, 42 in FIG. 13 are designed on the inner and bottom sides of the touch region 30 and the display region 32. Similarly, because the user interface pattern 40, 42 according to the present embodiment are displayed by the liquid crystal panel 50, which means their light sources are provided by the backlight module 51, no diode light source 510 is required according to the present embodiment and the cost can be reduced. The change in the structure of the designed is shown in FIG. 14, which shows a cross-sectional view along the CC' line in FIG. 13. As shown in the figure, the differences between FIG. 14 and FIG. 12 are the disposition locations of the first circuit board 60 and the user interface unit 90. Namely, the first circuit board 60 is moved to the second side 82 of the liquid crystal panel 50, while the user interface unit 90 is moved to the second inner side 86 of the edge of the touch layer 56. Besides, the user interface unit 90 is still located between the top and bottom polarization films 57, 52 and may overlap the display region 32 of the liquid crystal layer 54. The user interface unit 90 of the touch display panel 10 according to the present invention can be further designed on the first inner side 84 (as shown in FIG. 12) or the second inner side 86 (as shown in FIG. 14) of the touch layer 56. Thereby, no second circuit board 62 and no extra light source are required, which save the cost.

To sum up, the module structure according to the present invention comprises a backlight module, a liquid crystal panel, a touch layer, a first circuit board, a second circuit board, and a protection layer. The liquid crystal panel is disposed above the backlight module; the touch layer is disposed on the liquid crystal panel. The first circuit board is disposed on the liquid crystal panel, and is further disposed with a first side of the liquid crystal panel and a first side of the touch layer. The second circuit board is disposed on the liquid crystal panel, and is further disposed with a second side of the liquid crystal panel and a second side of the touch layer. Additionally, the protection layer is disposed above the touch layer, the first circuit board, and the second circuit board. Moreover, according to the touch display panel of the present invention, a user interface unit can be further disposed in the touch layer and required no second circuit board. Alternatively, the user interface unit can be disposed in the display region and requiring no second circuit board and no extra light source. Thereby, the techniques provided by the embodiments of the present invention can integrate the touch functions of the on-cell/in-cell touch panel and the physical keys and reduce the cost.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:
1. A module structure of touch display panel, comprising:
   a backlight module;
   a liquid crystal panel, disposed above said backlight module;
   a touch layer, disposed on said liquid crystal panel;
   a first circuit board, disposed on said liquid crystal panel, and disposed with a first side of said liquid crystal panel and a first side of said touch layer;
   a second circuit board, disposed on said liquid crystal panel, and disposed with a second side of said liquid crystal panel and a second side of said touch layer; and
   a protection layer, disposed above said touch layer, said first circuit board, and said second circuit board;
   wherein said first circuit board and said second circuit board are disposed on the surface of a top substrate of said liquid crystal panel.
2. The module structure of touch display panel of claim 1, wherein said first circuit board is changed to said second side of said liquid crystal panel and said second circuit board of said liquid crystal panel is changed to said first side.
3. The module structure of touch display panel of claim 1, further comprising:
   a bottom polarization film, disposed between said backlight module and said liquid crystal panel;
   a touch chip, disposed on the surface of said first circuit board;
   a top polarization film, disposed between said protection layer and said liquid crystal panel; and
   an adhesion layer, disposed between said top polarization film and said protection layer.
4. The module structure of touch display panel of claim 3, wherein said liquid crystal panel comprises:
   a bottom substrate, disposed on said bottom polarization film;
   a liquid crystal layer, disposed on said bottom substrate;
   a third circuit board, disposed on the surface of said bottom substrate; and
   a display chip, disposed on the surface of said bottom substrate and between said third circuit board and said liquid crystal layer, and connected electrically to said third circuit board;
   wherein said top substrate is disposed on said liquid crystal layer.
5. The module structure of touch display panel of claim 1, wherein the material of said protection layer includes glass, plastics, or decoration films; the thickness of said protection layer in glass and plastics is 0.5~0.7 millimeter; and the thickness of said protection layer using decoration films is 0.2 millimeter.
6. The module structure of touch display panel of claim 1, further comprising a user interface pattern on the surface of said protection layer and corresponding to said second circuit board.
7. The module structure of touch display panel of claim 1, wherein said second circuit board is a user interface circuit board.

* * * * *